United States Patent
DeVita et al.

[11] Patent Number: 5,898,161
[45] Date of Patent: Apr. 27, 1999

[54] WRIST-MOUNTED OPTICAL SCANNING AND POINTING SYSTEMS

[75] Inventors: Joseph DeVita, Patchogue; Joseph Katz, Stony Brook; Don Searle, Setauket; Mitchell Maiman, Holbrook; Jay McDonald, Sayville; John Potter, Medford; Gonzaga Joseph Chow, Huntington, all of N.Y.

[73] Assignee: Symbol Technologies, Inc., Holtsville, N.Y.

[21] Appl. No.: 08/805,444

[22] Filed: Feb. 25, 1997

Related U.S. Application Data

[60] Division of application No. 08/496,723, Jun. 29, 1995, abandoned, which is a continuation-in-part of application No. 08/381,515, Feb. 1, 1995, Pat. No. 5,793,032, which is a continuation-in-part of application No. 08/294,845, Aug. 29, 1994, abandoned.

[51] Int. Cl.$^6$ ........................................... G06K 7/10
[52] U.S. Cl. ................................ 235/462.44; 235/462.45; 235/472.01
[58] Field of Search ..................................... 235/462, 472, 235/454, 462.44, 462.45, 462.47, 472.01, 472.02

[56] References Cited

U.S. PATENT DOCUMENTS

| | | |
|---|---|---|
| 3,008,040 | 11/1961 | Moore . |
| 3,078,364 | 2/1963 | Neugebauer . |
| 3,940,758 | 2/1976 | Margolin ................................. 345/169 |
| 4,012,629 | 3/1977 | Simms . |
| 4,603,262 | 7/1986 | Eastman et al. ...................... 235/472 X |
| 4,935,610 | 6/1990 | Wike, Jr. .................................. 235/472 |
| 5,191,197 | 3/1993 | Metlitsky et al. ....................... 235/472 |
| 5,272,324 | 12/1993 | Blevins .................................... 235/462 |
| 5,329,106 | 7/1994 | Hone et al. .............................. 235/472 |
| 5,340,972 | 8/1994 | Sandor ..................................... 235/472 |
| 5,404,001 | 4/1995 | Bard et al. ............................... 235/462 |
| 5,514,861 | 5/1996 | Swartz et al. ............................ 235/472 |
| 5,543,610 | 8/1996 | Bard et al. ............................... 235/462 |
| 5,587,577 | 12/1996 | Schultz .................................... 235/472 |
| 5,654,534 | 8/1997 | Coleman . |

FOREIGN PATENT DOCUMENTS 0196382  8/1991  Japan .

*Primary Examiner*—Anita Pellman Gross
*Assistant Examiner*—Karl Frech
*Attorney, Agent, or Firm*—Kirschstein, et al.

[57] ABSTRACT

A wrist-mounted terminal for use in electro-optically reading bar code symbols, includes a main body having a display, and a strap for securing the body on and around a wrist of an operator. The terminal includes a detector for detecting light reflected off a symbol. A keypad is mounted on the body for movement between a concealed position in which manually depressible keys are hidden by the body, and an exposed position in which the keys are accessible. The keypad is preferably slidingly received within the body, or hinged to the body.

18 Claims, 6 Drawing Sheets

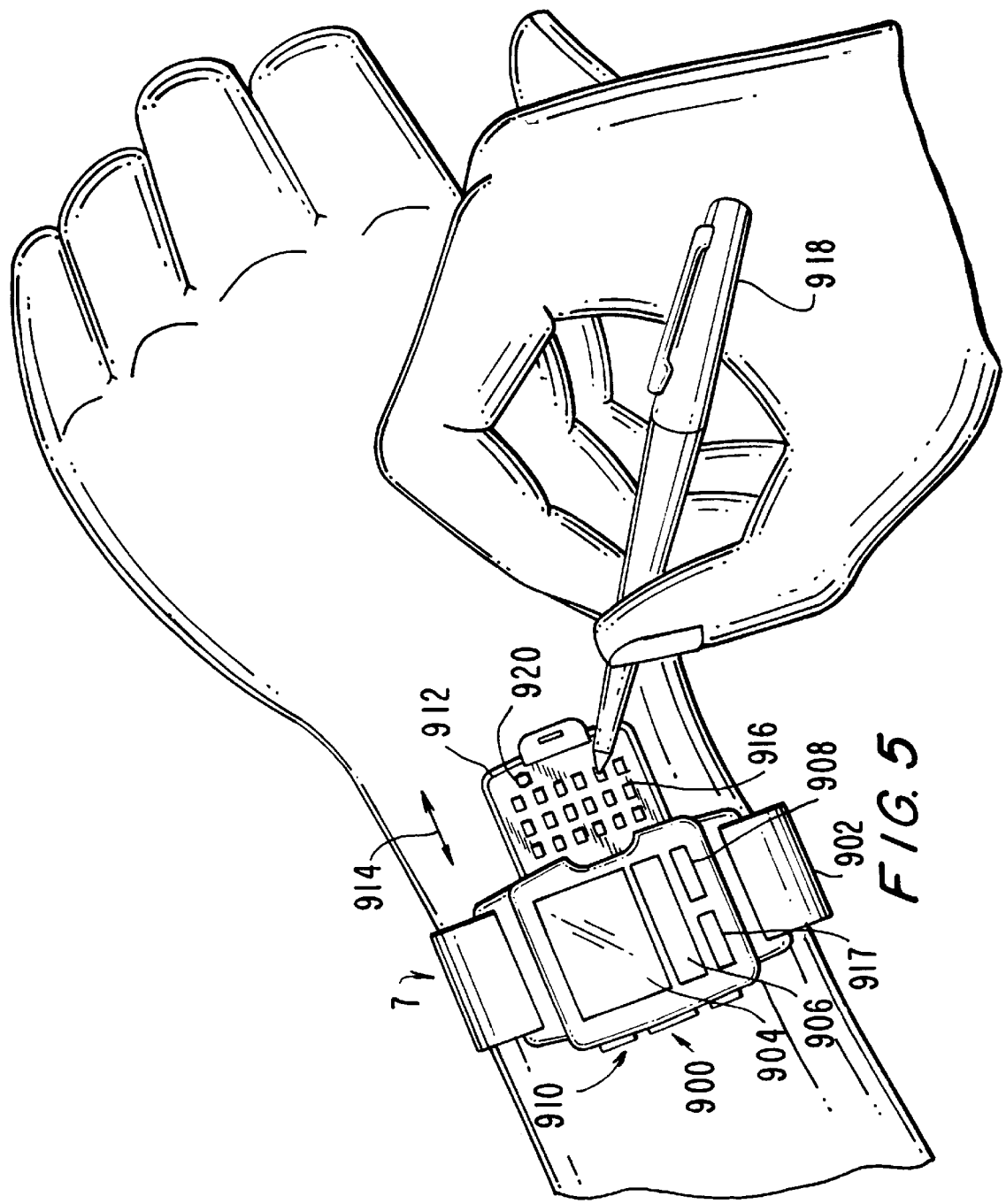

WRIST-MOUNTED OPTICAL SCANNING AND POINTING SYSTEMS

RELATED APPLICATIONS

This application is a division of U.S. application Ser. No. 08/496,723, filed Jun. 29, 1995, now abandoned which, in turn, is a continuation-in-part of U.S. application Ser. No. 08/381,515 filed Feb. 1, 1995, now U.S. Pat. No. 5,793,032 which is a continuation-in-part of U.S. application Ser. No. 08/294,845 filed Aug. 29, 1994 now abandoned.

BACKGROUND OF THE INVENTION

1. Field of the Invention

This invention relates to portable optical scanners for reading indicia of varying light reflectivity, and in particular to such scanners which are adapted to be worn on the person. The invention further relates to optical scanning systems in which the optical module for generating and emitting the light beam is physically separate and apart from the detector module.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798, 4,369,361, 4,387,297; and U.S. Pat. Nos. 4,409,470; 4,760,248; 4,896,026, all of which have been assigned to the present applicant. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

A "heads up" display unit comprising a head band and a bar code reader and visual display mounted thereon is disclosed in U.S. Pat. No. 5,208,449 for inventory management operations. The display allows cross-checking of commands issued orally by the operator into a microphone and speech recognition circuit and of codes read by the bar code reader.

It may in some circumstances be disadvantageous for the light generating and emitting module to be housed within the same unit as the light-receiving module and the decoding circuitry. In the first place, locating everything within the main housing requires that the bar code to be read is positioned so that most or at least a substantial proportion of the reflected light returns to the unit along the same path as the emitted light. It might not always be convenient for a user to position the bar code reading and/or the bar code so that the light is reflected back along the same path in that way. Secondly, locating everything within the same unit means that the unit has to be physically rather large and relatively heavy. Users may not find it easy to operate for long periods.

It is a general object of the present invention at least to alleviate some of these problems of the prior art.

It is a further object to provide a portable optical scanning system with improved ergonomics, and which will be easier for a user to operate for long periods.

It is a further object of the present invention to reduce the weight of a portable optical scanning system adapted to be held in the hand of a user, or mounted to the user's body.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

According to a first aspect of the present invention there is provided an optical system comprising a static beam laser pointer for illuminating an indicia to be read and a detector for detecting light reflected from the indicia wherein the pointer and the detector are arranged to be carried or worn by a user.

The pointer may comprise a gun- or pen-shaped unit or may be mounted on a ring or pair of eye-glasses or helmet to be worn by the user. The detector may comprise a wrist-watch unit or may be mounted on a garment of the user such as a lapel, a pocket, a belt or a pair of eye-glasses. The light detector may preferably by a CCD detector.

To scan the indicia, the user points the laser pointer in the relevant direction. The user then scans the beam across the indicia to be read by manually moving the laser pointer.

According to the invention there is further provided an optical system comprising a flying spot optical scanner for scanning an indicia and a detector for detecting light reflected from the indicia wherein the scanner and the detector are arranged to be carried or worn by the user. The optical scanner may be a gun or pen-shaped unit or may be mounted on a ring, helmet or eye-glasses to be worn by the user. The detector may be mounted onto a garment of the user such as a lapel, a pocket or a belt of the user or may be provided on a pair of eye-glasses to be worn by the user or may comprise a wrist-watch unit.

According to the invention there is yet further provided a detector for detecting light generated by an optical reading system and reflected by a target indicia wherein the detector comprises a wrist-watch unit. The wrist-watch unit may include a key pad, for example, a slide-out or fold-out moveable key pad or a plurality of such key pads.

When the detector takes the form of a wrist watch (or includes a wrist watch) it is relatively easy to ensure that the detector or detectors face in the right direction to receive the reflected light.

BRIEF DESCRIPTION OF THE DRAWINGS

FIG. 5 shows one arrangement of a watch-terminal having a slide-out portion;

FIG. 6d shows an alternative form of the watch/terminal in a fully open position.

DESCRIPTION OF THE PREFERRED EMBODIMENTS

Figure 1:
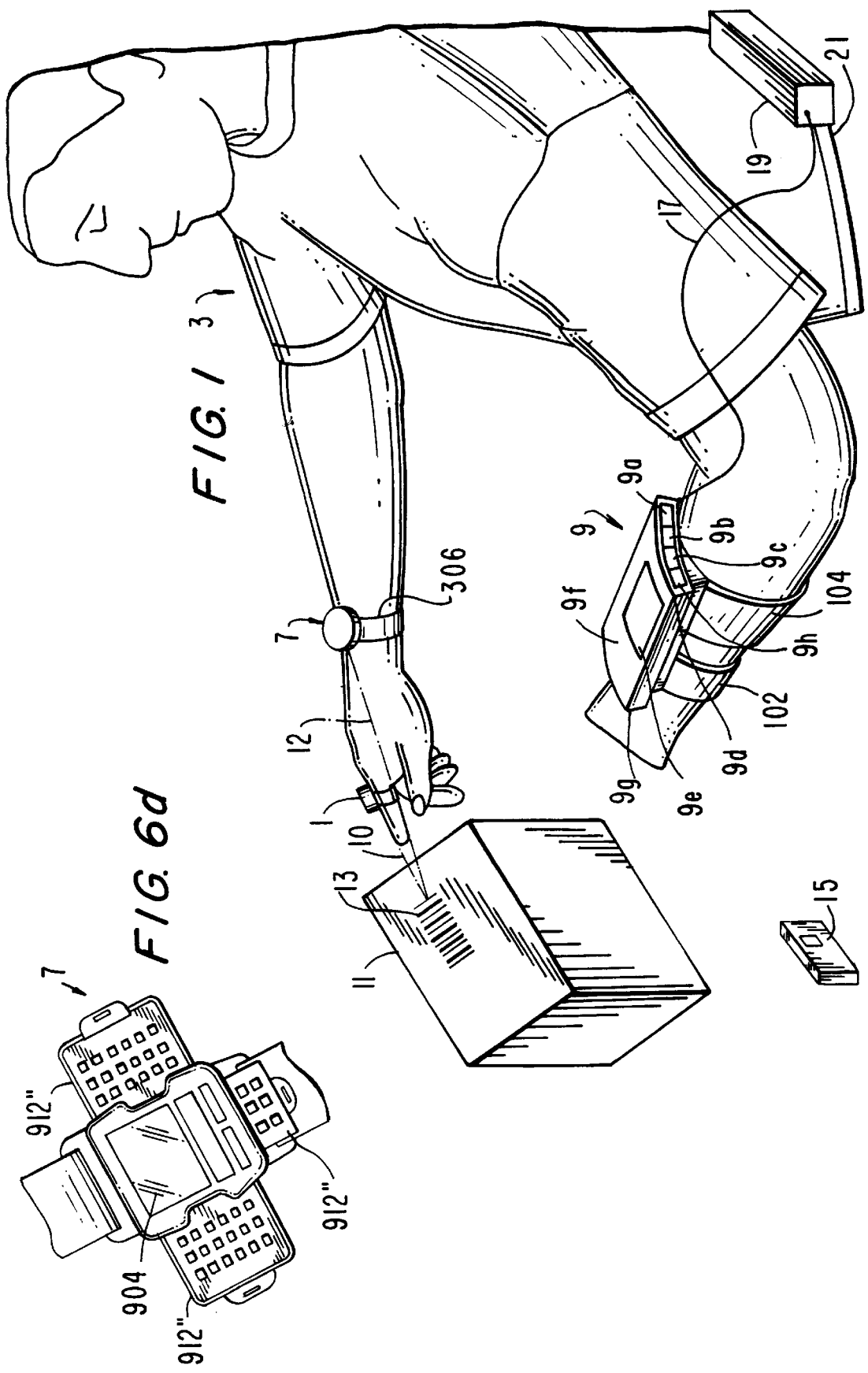
FIG. 1 depicts a portable optical scan system in accordance with a first embodiment of the present invention.

FIG. 1 shows a portable optical scan system in accordance with a first embodiment of the present invention. An optical scan module 1 is detachably mounted on a single finger of a user 3 using a ring-shaped mounting. The detachable mounting may be of any number of conventional types suitably adapted for its ease of use for the desired application. For example, a ball and flexible socket mounting, or a slide mounting could be used. Other mountings with movable restraining members might also be used.

In additional to the optical scan module 1, the user 3 wears a first peripheral module 7, on the wrist, and a second peripheral module 9 on the other arm. As will be clear from the Figure, the scan module 1 emits a scanning laser beam 10 which the user directs towards a bar code symbol 13 to be read. The bar code symbol may be printed on or otherwise attached to an article 11, details of which the user 3 wishes to obtain for example for inventory or for sale purposes. The scanning beam 10 is reflected from the bar code symbol 13, and the reflected light 12 is detected by the first peripheral module 7.

Other arrangements (not shown) could of course be envisaged, in which the peripheral module is secured to or forms part of articles of the user's clothing.

Figure 2:
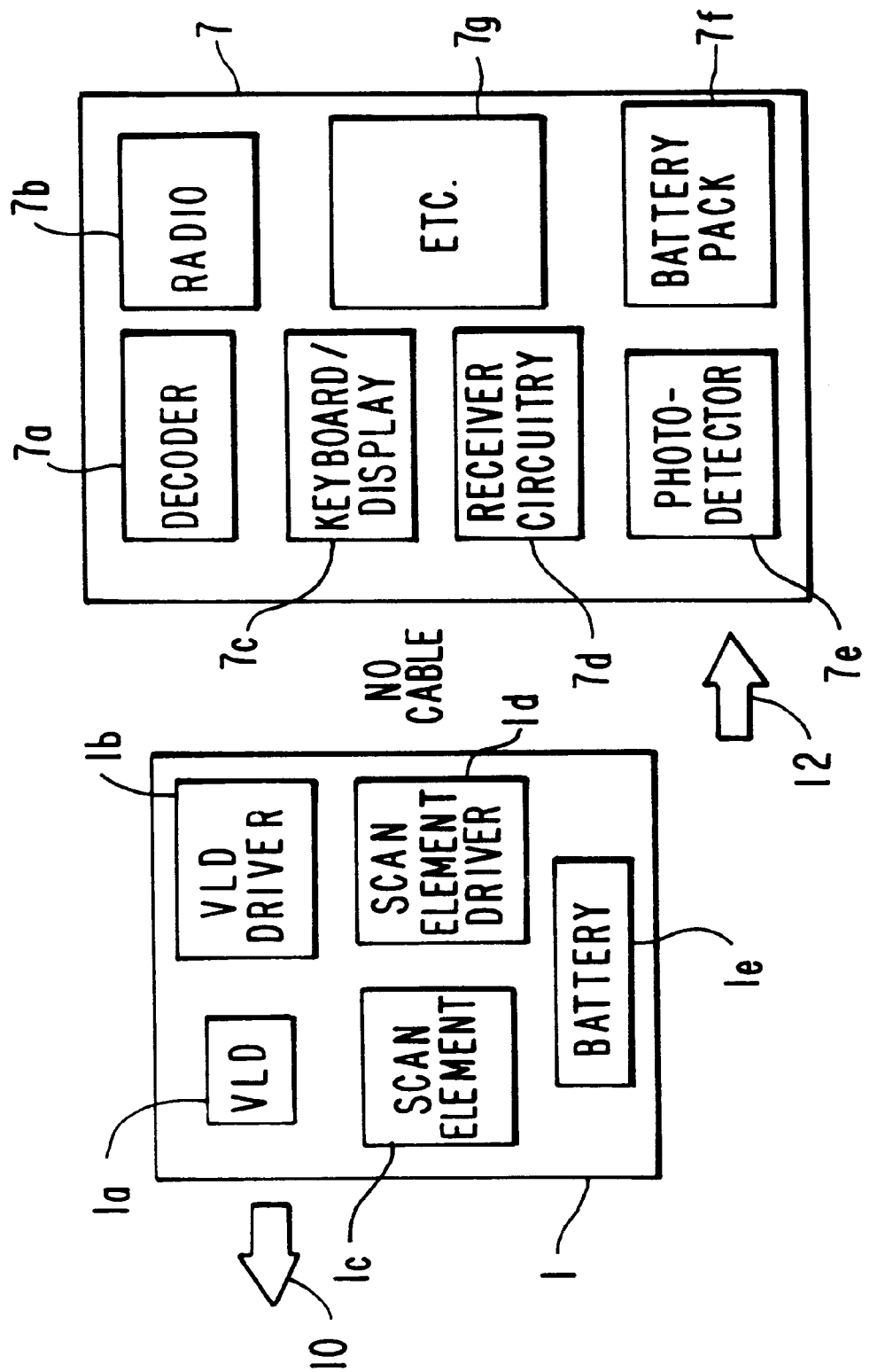
FIG. 2 illustrates schematically the ring unit and the wrist unit shown in FIG. 1.

FIG. 2 illustrates schematically the internal features of the scan module 1 and the first peripheral module 7. The module 1 incorporates a device for generating and scanning the light beam 10, desirably a visible laser diode (VLD) 1a, having a driver 1b. Scanning of the beam 10 is achieved by means of a scan element 1c, and a scan element driver 1d. Power is provided by means of a small battery 1e.

The first peripheral module 7 comprises a photodetector 7e and receiver circuitry 7d which are together arranged to detect the returning light beam 12. The output from the receiver circuitry is passed to a decoder 7a which is arranged to reconstitute the alphanumeric information which the bar code symbol 13 represents. The first peripheral module may also include a keyboard and/or display 7c along with other possible features 7g such as for example a time display so that the module 7 doubles as an ordinary watch when it is not in use as part of the optical scan system. A radio frequency (RF) or other wireless transmitter 7b, along with a battery pack 7f or other power supply completes the unit.

In use, the decoded information emanating from the decoder 7a is passed by wireless link from the radio 7b to the second peripheral module 9 which is located on the other arm or wrist of the user. The radio transmitter 7b could be a transceiver which is also capable of receiving signals from the second peripheral module 9 or from a separate base station 15.

The second peripheral module 9 incorporates a radio receiver 9a and a radio transmitter 9b for communicating with the first module 7 and/or with the base unit 15. Typically, the respective transmission frequencies will be different. The second peripheral module 9 further includes digitizing and processing circuits 9c which convert the transmitted analog signal to a digital signal and decode the signal in a conventional manner. An indicator light, beeper or audio transducer 9d signals the user when the decoding has been satisfactorily accomplished. Such notice could also or alternatively be provided by information displayed on a display unit 9e. A memory storage device 9h is also preferably included for temporary storage of the decoded data. A keypad 9f and/or touch screen may be used for inputting data to the system. A battery 9j is provided to supply power to the secondary peripheral module. Alternatively, or in addition, power may be supplied via an external lead 17 from a separate power supply 19 which is secured to the body of the user, for example on a belt 21.

Depending upon the preference of the user, the second peripheral module could be worn on the right arm, or wrist, like a watch (and in fact, may function as a watch) and the optical scan module 1 and the first peripheral module on the left. In an alternative embodiment (not shown) the second peripheral module 9 could be dispensed with, with all the features of that unit instead being incorporated within the first peripheral module 7. This would of course be expected to make the first peripheral module rather larger than is shown in the drawing.

It will be noted that in the arrangement shown in FIG. 1 there is no cable or other physical connection between the optical scan module 1 and either of the first or second peripheral modules. This improves the wearability of the system, and the likely user acceptance. It is also rather safer, since the lack of wires means that there is less to get caught as the user moves around, perhaps undertaking a variety of different tasks while wearing the devices shown.

In a variation of the embodiment described above, the scan element 1c and the scan element driver 1d may be omitted from the optical scan module 1, so that the beam 10 is essentially a fixed beam. With such an arrangement, the user would then physically move his or her hand or arm, thereby manually scanning the beam 10 across the bar code symbol 13. Such an arrangement has the advantage that the module 1 can be reduced in size and in weight, not only by elimination of the mechanical and electronic scanning features, but also because the battery 1e may substantially be reduced in size.

In the embodiment illustrated in FIG. 1 the module for generating the light beam 10 takes the form of or is incorporated within a ring which is worn on the user's finger. However, in other embodiments the ring 1 could be replaced by other types of optical module, some of which are shown schematically in FIGS. 3a, 3b and 4.

Figure 3A:
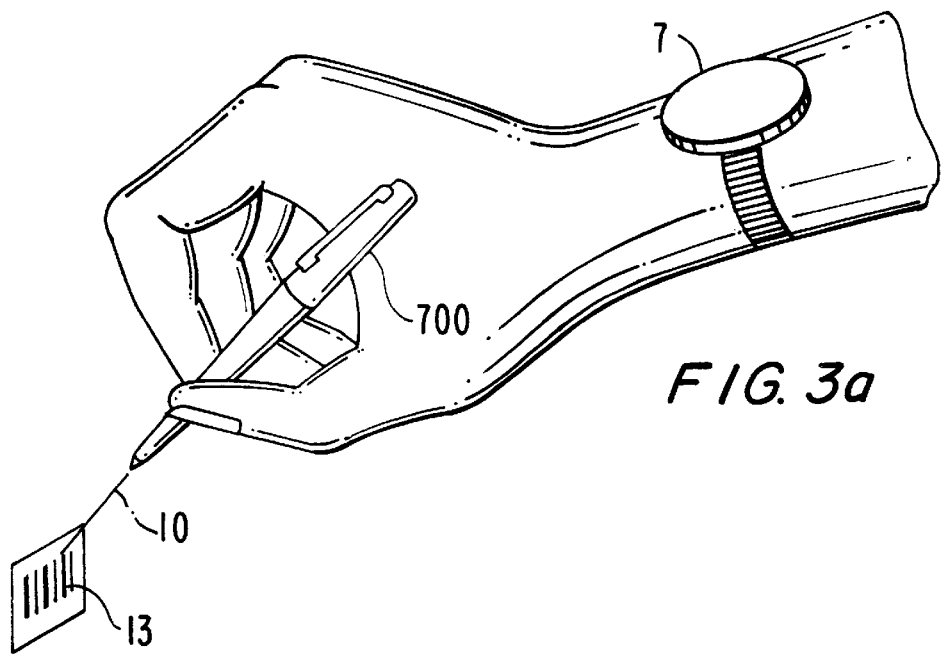
FIG. 3a shows a further embodiment in which the optical module comprises a pen shaped device.
Figure 3B:
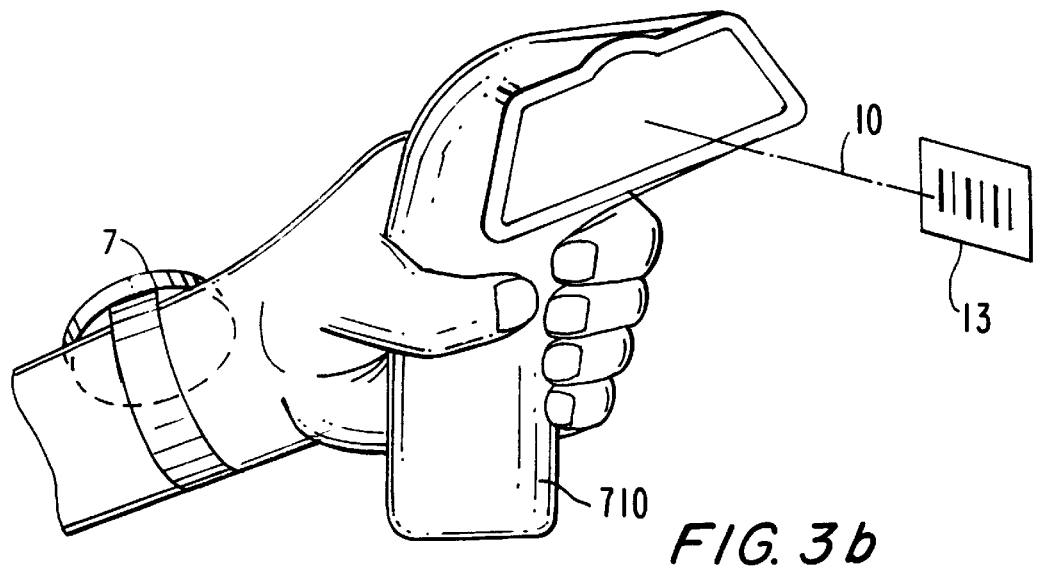
FIG. 3b shows a further embodiment in which the optical module comprises a gun-shaped device.

In FIG. 3a, the optical module takes the form of a pen-shaped device 700. In FIG. 3b the optical module takes the form of a gun-shaped device. Again, the pen may incorporate a miniature scanner for scanning the beam 10 automatically across the bar code 13, or alternatively a fixed beam may be provided which the user scans manually across the bar code.

Figure 4A:
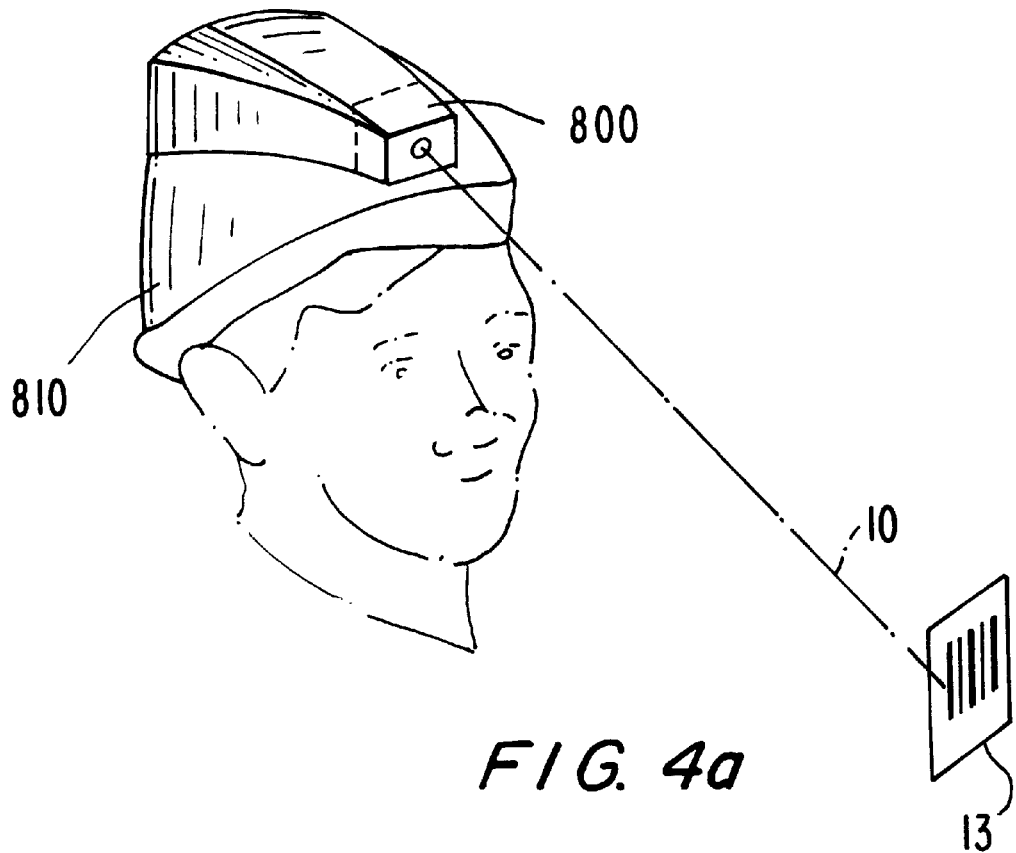
FIG. 4a shows a further embodiment in which the optical module is mounted to the headgear of a user.

A further embodiment is shown in FIG. 4a. Here, an optical module 800 is provided in head-gear comprising a helmet 810 worn by the user, aiming of the beam being carried out by head and eye movement. The module 800 may either automatically scan the beam 10 across the bar code 13, or alternatively a fixed beam may be provided which the user scans manually by movement of the head.

Figure 4B:
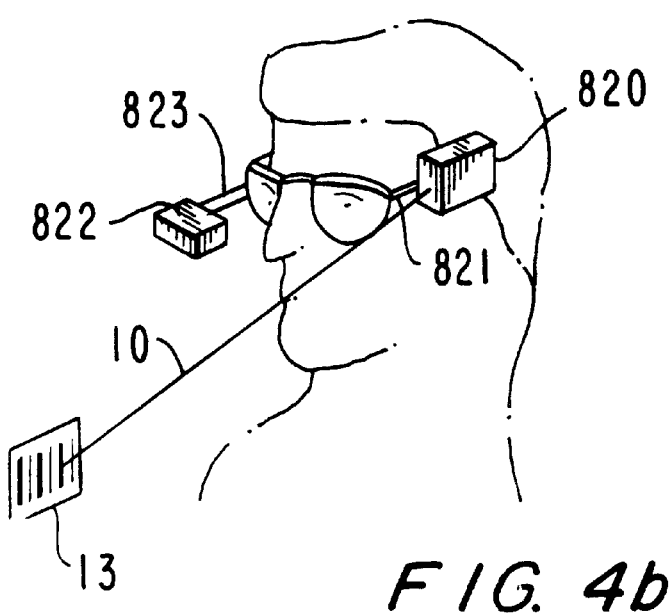
FIG. 4b shows a further embodiment in which the optical module is mounted on a user's eye-glasses.

In the embodiment shown in FIG. 4b an optical module 820 is mounted on a user's eye-glasses 821, aiming of the beam being carried out by head and eye movement. The module 820 may either automatically scan the beam 10 across the bar code symbol 13 or alternatively a fixed beam may be provided which the user scans manually by movement of the head. A detector 822 may also be mounted on the eye-glasses 821 on an arm 823. In either of the embodiments shown in FIGS. 4a and 4b the optical module can be mounted with or without RF communication components. Control electronics and the light generating module, including the light source, can be located in a common housing or separately, in which case communications between the parts can be carried out by cable RF or IR transmission. Automatic focusing can be achieved by monitoring retina activity of the user.

The unit 822 may contain a retina monitor so as to monitor the position of the eye of the user to analyze the direction in which the user is looking. Thus, as the user moves his eyes form left to right the retina monitor may record a left to right motion and the control electronics would be able to shift the direction of the emitted illumination beam from the helmet 810 or from the scanner unit 820 worn by the user synchronously from left to right in accordance with the movement of the user. This would enable the target to be illuminated synchronously with the user looking in that particular direction. Similarly, once the user has located a selected target and is looking at that target, the user would be able to activate the scanning mechanism to record the data of the bar code being observed and illuminated by the light beam. In this manner, the optical module forms a system in which a target located remotely from the user can be identified by the user and automatically identified by the scanning mechanism once the user has initiated a scanning action.

In addition, information pertaining to the operation of the systems the type or quality of the symbol, the status of the optical module or detector or any other relevant information could be displayed to the user using "heads-up" display technology or virtual reality technology. The systems could be triggered to read automatically using a pattern recognition technique.

In the embodiments of FIGS. 3, 4a and 4b, light reflected back from the bar code may be picked up by a watch/terminal 7. This could be worn on either wrist. Alternatively, a detector attached to the user's clothing could be used.

Another feature of the invention is to capture data in a hand-held or portable terminal, or the watch/terminal 7, and to transmit such data directly to the heads-up display for viewing by the user. Transmission technology may be similar to that of teleprompter technology, in which a light beam is projected to the heads-up display for reproduction of the image on the heads-up display, or may be more conventional RF or IR transmission of data to a receiver contained in the heads-up display.

Turning now to FIG. 5, there is shown a first preferred embodiment of the first peripheral module, namely the wrist unit 7 shown schematically in FIGS. 1 and 3.

The module 7 comprises a body portion 900 which is secured to the user's wrist by a strap 901, in the manner of a wrist watch. The body portion has a display 904, a miniature microphone 906, a photodetector 908, a transmitter unit 917 and a plurality of function keys 910. Beneath or within the body portion 900 there is stored a key pad 912 which can be slid in and out in the direction of the arrow 914 for access to the keys 916. The keys may be actuated by means of a pen or stylus 918.

In use, the unit receives at the photodetector 909 light which has been reflected from the bar code, and it automatically transmits a signal representative of the information received to a second peripheral unit, for example the arm unit shown in FIG. 1. If the user wishes to send an audio message to the second peripheral unit, that may easily be achieved simply by speaking into the microphone 906. The wrist unit then transmits the spoken words via radio communication from the transmitter 917 to the appropriate remote station.

Instead of or in addition to the photodetector 908 on the body 900, there may be a photodetector 920 on the keypad. In one preferred arrangement, the keys 916 on the keypad may relate to the bar code reading functions, with the keypad simply being slid back out of the way when those functions are no longer needed. The unit may then operate as a normal wrist watch, with the time being indicated on the display 904, and the watch being controllable by the function keys 910.

Figure 6A:
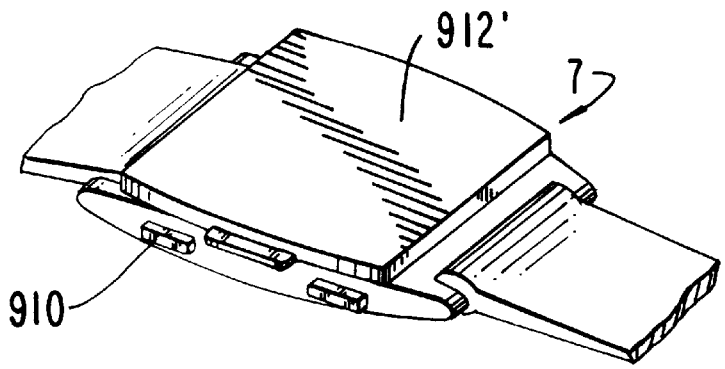
FIG. 6a shows an exemplary watch/terminal having a fold-out portion in a closed position.
Figure 6B:
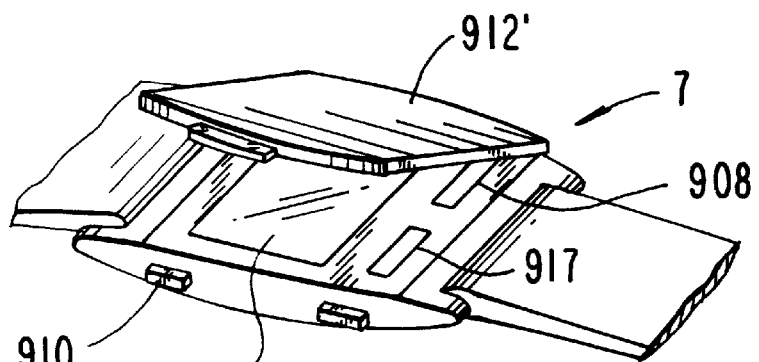
FIG. 6b shows the watch/terminal of FIG. 6a in a partially open position.
Figure 6C:
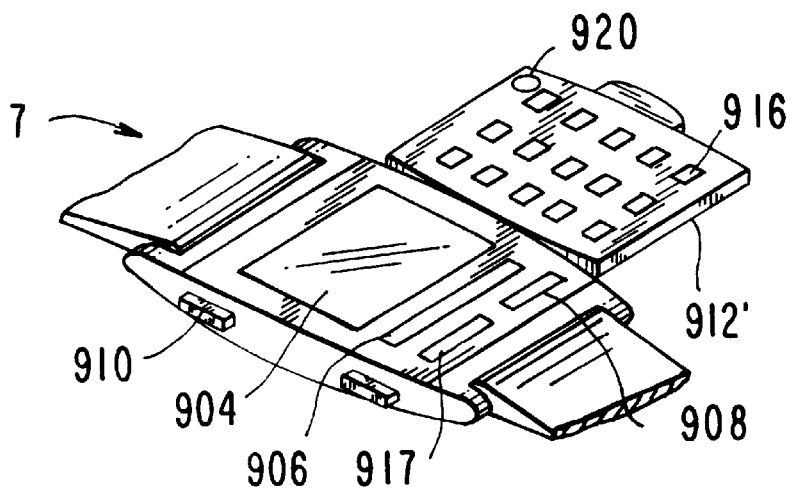
FIG. 6c shows the watch/terminal in a fully open position.

An alternative embodiment is shown in FIGS. 6a to 6c. This corresponds generally to the embodiment of FIG. 5, and like features are marked with like reference numerals. The only difference is that the slidable keypad 910 in FIG. 5 is replaced in FIGS. 6a to 6c with a hinged keypad unit 912'. In the closed position, shown in FIG. 6a, the keypad acts as a cover for the unit. Hinging the cover back, reveals the keys 916, and in the preferred arrangement the photodetector 920. In the alternative form of wrist unit 7 shown in FIG. 6d, when in the open position key pads 912" extend either side of, and below the display 904. The key pads 912" may be slid out or hinged out, or some may be slid out and some hinged out.

It is anticipated that the watch/terminal configuration shown in FIGS. 5 and 6a to 6c may find applications in fields other than the optical scanning of indicia. To that end, it is envisaged that where the photodetector 908, 920 is not required, it may simply be omitted. Likewise, where the microphone 906 is not required, that too may be omitted.

In those cases in which the optical scan module 1 does not incorporate a beam scanning mechanism, the module 1 effectively becomes a ring-mounted laser pointer. Such a pointer may, as previously described, be used for scanning applications merely by scanning the beam manually across the indicia to be detected, and providing separate detectors elsewhere, either fixedly mounted or secured to the body of the user, which detect the reflected beam. However, a laser pointer of this type is not necessarily restricted to scanning applications, and could instead be used at lectures, seminars, meetings and so on, or indeed at any type of public presentation.

Batteries for wearable devices of the types which have already been described typically occupy a significant proportion of the device's volume, and additionally contribute to its weight. Where substantial power is required, such as for example the devices illustrated in FIGS. 1 and 2, a separate battery pack 19 is often the most convenient way to provide the power that is needed. However, in a variation of the embodiments previously described, power may instead or in addition be provided by a thin flexible battery which forms part of the band that wraps around the arm, wrist or finger of the user. Specifically, in FIG. 1 the wrist band 306 could be such a battery, as could be the arm bands 302, 304.

Preferably, the battery is of the lithium polymer rechargeable type, which is simply cut into the appropriate shape. Such batteries may provide sufficient power, on their own, for operation of some devices; in other case, they may be used as an auxiliary battery, thereby reducing the size of the additional cells that may be necessary.

To make it easier to put the device on and to take it off, an alternative embodiment (not shown) provides for one end of the battery to be hinged to the underside of the scanner. The other end is secured by an easily-releasible clasp. To put the device on, or to take it off, the user merely releases the clasp and hinges the battery away from the underside of the scanner.

What is claimed is:

1. A wrist-mounted terminal for use in electro-optically reading indicia, comprising:

a main body having an interior cavity and a display for displaying information;

a strap secured to the main body, for securing the main body on and around a wrist of an operator;

a detector supported by the main body, for detecting light of variable intensity reflected off an indicium to be read, and for generating an electrical signal indicative of the detected light intensity; and a movable keypad having a plurality of manually depressible keys for entering data relating to the indicia, said keypad being mounted on the main body for movement relative to the main body between a concealed position in which the keypad is received in the interior cavity and the keys are concealed by the main body, and an exposed position in which the keys are exposed and accessible to be depressed by the operator.

2. The wrist-mounted terminal according to claim 1, wherein the keypad is mounted for sliding movement in and out of the interior cavity.

3. The wrist-mounted terminal according to claim 1, wherein the keypad has a handle for enabling the keypad to be moved between said positions.

4. The wrist-mounted terminal according to claim 1, wherein the display overlies the keypad in the concealed position.

5. The wrist-mounted terminal according to claim 1, wherein the main body has a front face on which the display is situated, and wherein the detector is situated on the front face.

6. The wrist-mounted terminal according to claim 1; and further comprising a radio transmitter supported by the main body, for transmitting the electrical signal to a remote station away from the main body.

7. The wrist-mounted terminal according to claim 6, and further comprising a microphone supported by the main body, for converting sounds picked up by the microphone into audio signals, and wherein the radio transmitter is also operative for transmitting the audio signals to the remote station.

8. The wrist-mounted terminal according to claim 1; and further comprising function keys on the main body, and wherein the display visually displays time information controlled by the function keys.

9. The wrist-mounted terminal according to claim 1; and further comprising a battery for supplying electrical power to the detector.

10. A wrist-mounted terminal for use in electro-optically reading indicia, comprising:

a main body having a display for displaying information;

a strap secured to the main body, for securing the main body on an around a wrist of an operator;

a detector supported by the main body, for detecting light of variable intensity reflected off an indicium to be read, and for generating an electrical signal indicative of the detected light intensity; and a movable keypad on which the detector is situated and having a plurality of manually depressible keys for entering data relating to the indicia, said keypad being mounted on the main body for movement relative to the main body between a concealed position in which the keys are concealed by the main body, and an exposed position in which the keys are exposed and accessible to be depressed by the operator.

11. The wrist-mounted terminal according to claim 10; and further comprising a radio transmitter supported by the main body, for transmitting the electrical signal to a remote station away from the main body.

12. The wrist-mounted terminal according to claim 11; and further comprising a microphone supported by the main body, for converting sounds picked up by the microphone into audio signals, and wherein the radio transmitted is also operative for transmitting the audio signals to the remote station.

13. The wrist-mounted terminal according to claim 10; and further comprising function keys on the main body, and wherein the display visually displays time information controlled by the functions keys.

14. The wrist-mounted terminal according to claim 10; and further comprising a battery for supplying electrical power to the detector.

15. The wrist-mounted terminal according to claim 10, wherein the keypad is hinged to the main body for pivoting movement about a pivot axis.

16. The wrist-mounted terminal according to claim 15, wherein the keypad has a handle for enabling the keypad to be pivoted between said positions.

17. The wrist-mounted terminal according to claim 15, wherein the keypad overlies the display in the concealed position.

18. The wrist-mounted terminal according to claim 10, wherein the keypad has a plurality of keypad sections, each of said sections being individually hinged to the main body for pivoting movement about a respective pivot axis.

* * * * *